(12) United States Patent
May

(10) Patent No.: US 6,292,480 B1
(45) Date of Patent: *Sep. 18, 2001

(54) ELECTRONIC COMMUNICATIONS MANAGER

(75) Inventor: David C. May, McKinney, TX (US)

(73) Assignee: Nortel Networks Limited, Quebec (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/871,514

(22) Filed: Jun. 9, 1997

(51) Int. Cl.[7] ............................. H04L 12/56; H04M 1/64

(52) U.S. Cl. ..................... 370/352; 370/466; 379/88.17

(58) Field of Search ................................. 370/466, 467, 370/465, 351, 352, 356, 493–494, 495, 355, 400–402; 379/88.13, 88.14, 88.17, 88.18, 88.24, 93.01, 93.12, 93.24, 67.1; 704/270, 271, 290, 275; 709/217, 218; 707/40, 100

(56) References Cited

U.S. PATENT DOCUMENTS

| 5,602,846 | 2/1997 | Holmquist et al. . |
| 5,608,786 | 3/1997 | Gordon . |
| 5,732,078 | * 3/1998 | Arango ................................ 370/355 |

(List continued on next page.)

FOREIGN PATENT DOCUMENTS

WO9714238 * 4/1997 (WO) .................. 370/351

OTHER PUBLICATIONS

Computer Select, *VARbusiness, Universal mailbox*, Sep. 15, 1996, pp. 1–5.
Computer Select, *Teleconnect, LAN–based apps.*, Mar. 1996, pp. 1–4.
Computer Select, *PCWEEK, Novell's telephony plan at sink–or–swim juncture.*, Mar. 25, 1996, pp. 1–4.
Computer Select, *Edge, on & about At&T, Wireless; GTE & Precision Systems to offer enhanced services to wireless carriers.*, Apr. 1, 1996, p. 1.
Computer Select, *Edge, on & about AT&T, Applied Voice Technology annouces CallXpress3 Release 4.0; users gain major new options in voice & call processing; call management, speech recognition, caller ID, & "live reply" are highlights of all the new system.*, Jun. 17, 1996, pp. 1–2.

(List continued on next page.)

*Primary Examiner*—Wellington Chin
*Assistant Examiner*—Steven Nguyen
(74) *Attorney, Agent, or Firm*—Haynes and Boone, LLP

(57) ABSTRACT

An electronic communications manager for providing an interface between a user using a communication device and a data and/or telephone network is disclosed. The data network, which may include an internet or intranet, is connectible to at least one information provider as well as a second user, and the telephone network is also connectible to the second user. The electronic communications manager can receive and interpret voice, such as from the first user using a telephone, as well as data, such as from the first user using a computer or information appliance. Likewise, the electronic communications manager can provide voice/video, such as for interacting with the first user through the telephone, and can provide data, such as interacting with the first user through the pager or interacting with the second user through the data network. Furthermore, the electronic communications manager can send and receive internet protocol to and from the information provider.

13 Claims, 1 Drawing Sheet

U.S. PATENT DOCUMENTS

| | | | | |
|---|---|---|---|---|
| 5,761,280 | * | 6/1998 | Noonen et al. | 379/93.27 |
| 5,867,495 | * | 2/1999 | Elliott | 370/352 |
| 5,884,032 | * | 3/1999 | Bateman et al. | 370/356 |
| 5,884,262 | * | 3/1999 | Wise et al. | 704/270 |
| 5,884,312 | * | 3/1999 | Dustan | 707/10 |
| 5,915,001 | * | 6/1999 | Uppaluru | 379/88.17 |
| 5,953,392 | * | 9/1999 | Rhie et al. | 379/88.13 |

OTHER PUBLICATIONS

Computer Select, *Edge, on & about AT&T , Voice processing: Brite to launch speech activated voice mail for wireless*, Sep. 16, 1996, p. 1.

Computer Select, *Edge; Work–Group Computing Report, Voice processing: CallWare and Berkeley Speech bring text–to–speech to Intranet Telephony Suite of products; Novell's GroupWise 5 users can now listen to scheduling, e–mail and fax through CallWare*, Sep. 23, pp. 1–2.

Computer Select, *Teleconnect; International Wildfire*, Jan. 1996, pp. 1–3.

Computer Select, *Computer Letter, Number, please . . .* , Mar. 18, 1996, pp. 1–4.

Computer Select, *Teleconnect; Unified messaging comes of age.*, Sep. 1996, pp. 1–6.

Fortune Magazine, Tony Lovell & William Warner, *Wildfire Communications*, Jul. 8, 1996, p. 92.

Telephony Magazine, Karen Egolf, *Single Number Expands to Multiple Applications*, May 13, 1996, pp. 26–28.

WIPO, WO 96/11542, published Apr. 18, 1996.

* cited by examiner

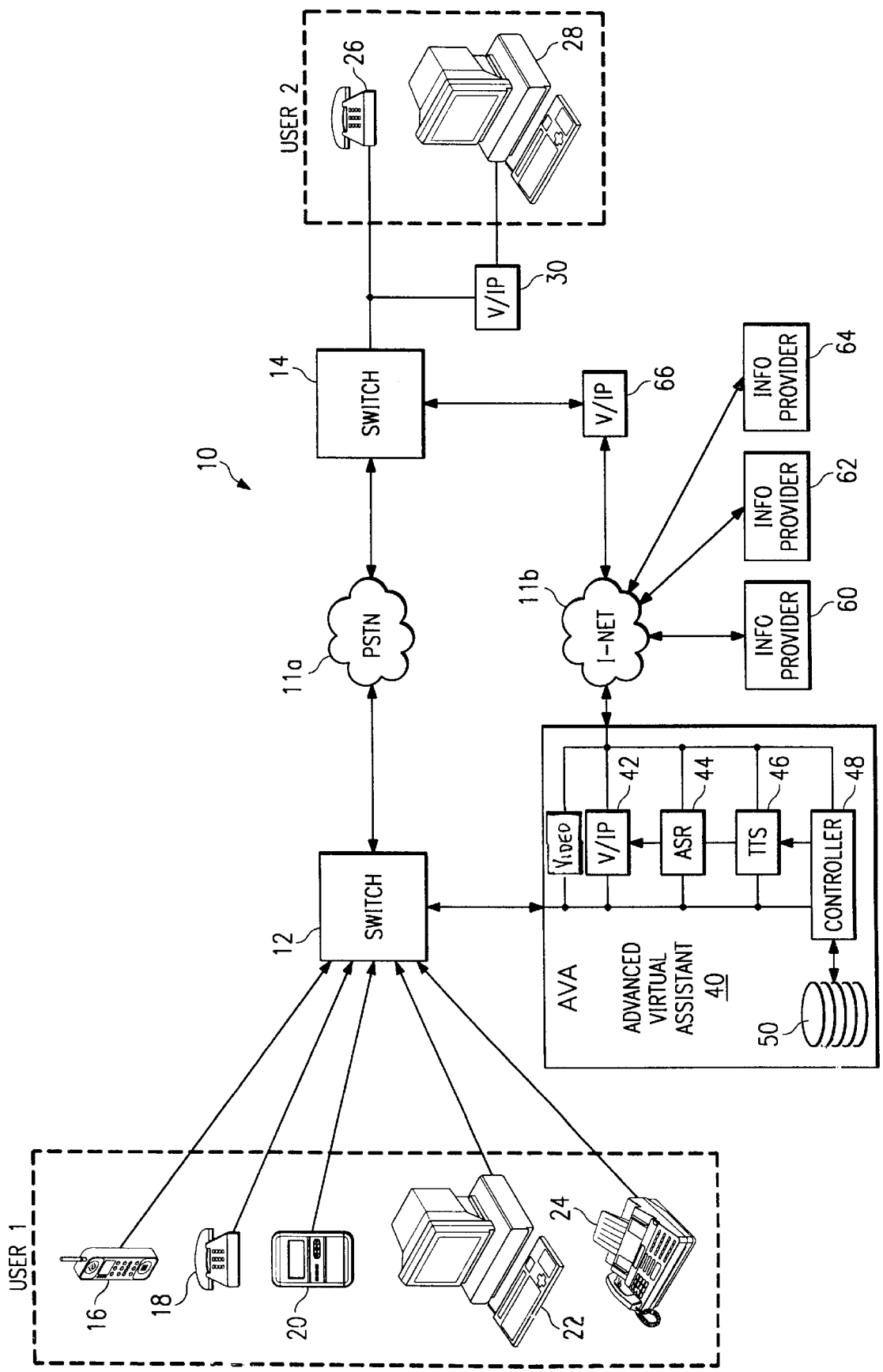

ELECTRONIC COMMUNICATIONS MANAGER

TECHNICAL FIELD

This invention relates generally to user/network interface systems, and in particular, to the utilization of an integrated, electronic communications manager referred to as an Advanced Virtual Assistant ("AVA") for interfacing a user with both telephony and data networks.

BACKGROUND OF THE INVENTION

The remote accessability of people and information is continually increasing. A person now has at his disposal many different communication devices, such as a telephone, cellular telephone, pager, facsimile, and e-mail. Likewise, the availability of general information such as financial data, business information, weather reports, and/or newspapers, as well as personal information such as a one's calendar or schedule, has grown tremendously.

An advantage to the increasing diversity of communication devices is that the person now has the possibility of greater mobility as well as different mediums for receiving information. However, the increased number of communication devices, coupled with the increased availability of information, makes providing a desired portion of information to one of the communication devices more and more difficult. In fact, often a full-time personal assistant is required to successfully connect to the desired information to the communication device. Unfortunately, not everyone can afford a personal assistant, nor are most personal assistants available around the clock.

In addition to the increasing diversity of communication devices, there is an increasing diversity of communication paths. Traditionally, for two people to talk on their telephones, they had to use a long distance provider in the public switched telephone network. However, there are now alternative communication paths that have specific benefits that make them desirable alternatives to the long distance provider. For example, two people may talk to each other over the internet. Although the "grade" of service is not as reliable as from the long distance providers, the cost is very low. It is difficult, however, to switch ones telephone from one communication path to another, such that most people simply use the long distance provider, even though at times, the higher grade of service provided is nonessential.

Therefore, what is needed is an electronic communications manager that can provide all the benefits of a personal assistant without the extra cost or working hour limitations.

In addition, what is needed is an electronic communications manager that provides a selectable grade of communication service by providing easy access to multiple communication paths.

SUMMARY OF THE INVENTION

In response to such difficulties, a technical advance is achieved by providing an integrated, electronic communications manager, hereinafter referred to as an Advanced Virtual Assistant ("AVA"), that provides an intelligent interface between a user and a data network and/or a telephone network. The user may communicate with the AVA using one or more types of communication devices. The data network, which may include an internet or intranet, one or more databases, and applications such as a universal mailbox, schedules, and/or calendars, is connectible to at least one information provider, such as, for example, an investment/financial data tracking service.

The AVA can receive and interpret voice, such as those received from the user using a telephone, as well as data, such as those received from the user using a computer. Likewise, the AVA can provide voice, such as would be necessary for interacting with the user via a telephone, and can provide data, such as would be necessary for interacting with the user via a pager. Furthermore, the AVA can send internet protocol to and receive internet protocol from an information provider. As a result, the voice spoken by the user and directed to the information provider are translated by the AVA into data for transmission to the information provider. In addition, the information provider can make responsive data available in reply to the user's voice, which data is appropriately translated by the AVA for communication to the user.

In another embodiment, the AVA also enables the user to select whether to connect to a second person via a telephone network or a data network. In this case, both the telephone network and the data network are connectible to the second person. Since the telephone network and the data network provide different "grades" of communication service, the AVA thus enables the user to select between the different grades.

A technical advantage achieved with the invention is that the AVA can provide all the benefits of a personal assistant without the extra cost or working hour limitations.

Another technical advantage achieved with the invention is that a significant reduction in communications cost is achieved through use of a selectable grade of communication service, including voice-over internet.

BRIEF DESCRIPTION OF THE DRAWINGS

FIG. 1 illustrates a communication network employing one embodiment of an AVA of the present invention.

DESCRIPTION OF THE PREFERRED EMBODIMENT

Referring to FIG. 1, the reference numeral 10 designates a communication network including both a public switched telephone network ("PSTN") 11a and a data network ("I-NET") 11b. The I-NET 11b represents one or more intranets and/or internets. Connected to the PSTN 11a are two switches 12, 14. For the sake of example, each of the switches 12, 14, is shown in FIG. 1 as comprising a single network switch. It is understood, however, that the switches 12, 14, may comprise any type of switch, such as a private branch exchange (PBX) switch or a long distance carrier switch. Therefore, any type of line/trunk determination illustrated or described herein is for the sake of example, and is not intended to limit the invention.

The switch 12 enables a first user ("USER1") to interface with the PSTN 11a and I-NET 11b using one or more of a variety of communication devices, including, for example, a cellular phone 16, a telephone 18, a pager 20, a computer or information appliance (generically referred to as a "PC") 22, and a facsimile machine 24. In addition, the telephone 18 is further connected to a voice-mail system (not shown). It is understood that each of the communication devices may interface with the switch 12 with many different communication links, such as a wireless/cellular link for the cellular phone 16 and the pager 20, a telephone line for the telephone 18 and the facsimile machine 24, and a data link for the personal computer 22. Therefore, accommodation of many different types of communication devices and corresponding communication links is anticipated.

Similarly, switch 14 enables a second user ("USER2") to interface with the PSTN 11a and I-NET 11b using a variety of communication devices including, for example, a telephone 26 and a PC 28. The PC 28 is connected to a voice-over internet protocol device ("V/IP") 30 for transmitting data packets between the I-NET 11*b* and the PC 28.

Connected to the switch 12 is an Advanced Virtual Assistant ("AVA") 40, which serves as an integrated, electronic communications manager between USER1 and the I-NET 11*b* as described in greater detail below. In the preferred embodiment, the AVA 40 is an adjunct to the switch 12 and therefore also includes several T-1 trunk interface cards (not shown). However, it is understood that the AVA 40 may be incorporated into the switch 12 itself or may be associated with another switch (also not shown). The AVA 40 includes a V/IP 42, an automatic speech recognition device ("ASR") 44, a text-to-speech device ("TTS") 46, a controller 48 and a storage device 50.

Also connected to the I-NET 11*b* are three information providers 60, 62, 64, and a V/IP 66. Although each of the information providers 60, 62, 64, may be one of any number of different types of information providers, for the sake of example it will be assumed that the provider 60 is a financial information provider, the provider 62 is a concierge information provider, and the provider 64 is a local area network (LAN) information provider that is also connected to the PC 22. The V/IP 66 connects the I-NET 11*b* to the switch 14. It should be recognized that the V/IP 66 and the V/IP 30 overlap somewhat in their functionality, and therefore either or both may be provided in the communications system 10.

The method in which the AVA 40 communicates with USER1 depends on the communication device 16, 18, 20, 22, and/or 24 being used. For example, USER1, using the telephone 18, can provide voice, which the AVA 40 interprets using the ASR 44 and provides to the controller 48. Likewise, the AVA 40 can signal USER1 with voice prompts by using the TTS 46 or pre-recorded voice clips, with pager messages by using an external paging system (not shown), e-mail, voice mail, video-mail, facsimiles, or other types of messages. In addition, the AVA 40 may communicate with USER1 through a web page (also not shown) and may supply video clips to the PC 22. As a result, the AVA 40 serves as a media cross-translator by interpreting information provided in one format (e.g., voice) to a totally different format (e.g., data). Furthermore, the AVA 40 can serve as a video interactive voice response unit. It is understood that descriptions of voice and data are merely exemplary of many types of formats including video, text, control codes, DTMF tones, serial bit streams, wireless signals, and other types of communications.

USER1 may interact with the I-NET 11*b*, and hence the information providers 60, 62, 64, through the ASR 44 using, for example, speech recognition, or through the controller 48, for example, via USER1's PC 22 directly through the web page. The V/IP 42 also enables USER1 and USER2 to verbally communicate via the I-NET 11*b*. The AVA 40 thereby provides several benefits, two of which are media cross-translation between USER1 and the information providers, and a selectable grade of service between USER1 and USER2, both described in greater detail below.

I. Advanced Information Access

The controller 48 maintains a profile for USER1 in the storage device 50. The profile includes voice prints for use by the ASR 44 for voice identification and verification, account numbers for use with the various information providers, preferences such as airline seat preferences or favorite pizza restaurant, and speed dials, including grade of service selection. The profile also includes a schedule that describes the accessibility of USER1. The schedule may contain working hours in which USER1 is accepting calls at work, home hours in which USER1 is accepting calls at home and off-hours when calls should be directed to voice-mail.

To better explain how the controller 48 uses the profile to interact with the information providers 60, 62, 64, the following scenarios are helpful.

A. Financial Information Provider 60

USER1, using the telephone 22, wants to be informed of certain financial information. The financial information provider 60 is a service, accessible through the I-NET 11*b*, that can report the financial information, as described in Table 1, below.

TABLE 1

Access to Financial Services

| | |
|---|---|
| Action: | USER1 dials the AVA 40 and hears ringing. |
| Action: | AVA 40 answers the ringing line and speaks to USER1 using a prerecorded voice clip. |
| AVA 40: | "Good morning and thank you for calling AVA, your Advanced Virtual Assistant for Financial Services. Please enter (or say) your social security number and state your name." |
| USER1: | "123-45-6789, David May" |
| Action: | AVA 40 verifies the account number and name, as interpreted by the ASR 44. Alternatively, AVA 40 may simply require USER1 to state only his name, and then verify the account information through voice identification/verification procedures. AVA 40 speaks to USER1 using the TTS 46 or voice clips. |
| AVA 40: | "Thank you David May. Would you like to make a trade, get information or update your preferences?" |
| USER1: | "Uh, I guess I want to update my preferences." |
| AVA 40: | "Which preference would you like to update?" |
| USER1: | "Change my notification preferences." |
| AVA 40: | "Would you like to be notified when there is significant market movement in your portfolio?" |
| USER1: | "Yes, I would." |
| AVA 40: | "Under what conditions would you like to be notified?" |
| USER1: | "When there is movement of 20%." |
| AVA 40: | "Over what period of time?" |
| USER1: | "Good question. Over a two day period." |
| AVA 40: | "How would you like to be notified?" |
| USER1: | "Notify me via my pager." |
| AVA 40: | "Would you also like to be notified of related news stories of companies in your portfolio." |
| USER1: | "Yea sure. Thanks." |
| AVA 40: | "And how would you like for me to communicate these stories to you?" |
| USER1: | "Just send them to my fax machine." |
| AVA 40: | "Your home or your office fax machine." |
| USER1: | "Send it to my home fax machine." |
| AVA 40: | "I will notify you via your pager if there is movement greater than 20% in your portfolio over a two day period. I will also notify you via your home fax of any related news stories. Is this correct?" |
| USER1: | "That's it." |
| AVA 40: | "Dave, I see you haven't contributed to your IRA for 1996. Would you like someone to contact you?" |
| USER1: | "Yea, I guess so." |
| AVA 40: | "Thank you Dave. It was a pleasure to serve you. I am AVA. Your Advanced Virtual Assistant for Financial Services." |
| Action: | USER1 goes on-hook. |
| Action: | AVA 40, through the V/IP 42, sends the acquired information to the financial information provider 60. |
| Action: | When the financial information provider needs to provide information to USER1, it provides it to AVA 40. AVA 40 then transfers the information according to the above instructions. |

B. Concierge Information Service 62

USER1, using the telephone 22 wants to purchase an item. The Concierge Information Service 62 is a service, accessible through the I-NET 11*b*, that can provide the requested item, as described in Tables 2 and 3, below.

TABLE 2

Access to Concierge Services, part 1

| | |
|---|---|
| Action: | USER1 dials the AVA 40 and hears ringing. |
| Action: | AVA 40 answers the ringing line and speaks to USER1 using a prerecorded voice clip. |
| AVA 40: | "Good morning and thank you for calling AVA, your Advanced Virtual Assistant for Concierge Services. Please enter your social security number and state your name." |
| USER1: | "123-45-6789, Brian Thompson" |
| Action: | AVA 4 verifies the account number and name, as interpreted by the ASR 44. Alternatively, AVA 40 may simply require USER1 to state only his name, and then determine and verify the account information through voice identification/verification procedures. |
| Action: | AVA 40 speaks to USER1 using the TTS 46. |
| AVA 40: | "Thank you Brian Thompson. How may I help you?" |
| USER1: | "I'm looking for a restaurant." |
| AVA 40: | "Do you plan to go to the restaurant or would you like the food delivered?" |
| USER1: | "Delivered please." |
| AVA 40: | "Very good. What type of food would you like delivered? Pizza, Chinese or something else?" |
| USER1: | "Pizza please." |
| AVA 40: | "Would you like it delivered to your home or somewhere else?" |
| USER1: | "To my home please." |
| AVA 40: | "One moment while I connect you to your local Domino's Pizza." |
| USER1: | "Thank you." |
| Action: | Alternative 1: AVA 40 calls Domino's Pizza. If this is the first time to call Domino's Pizza, AVA 40 may prompt USER1 for certain information to determine the closest restaurant. |
| Action: | AVA 40 listens in on the call. USER1 may bring AVA 40 into the call for information such as credit card number, etc. AVA 40 waits for USER1 to say "Goodbye". |
| Domino's Pizza: | "Hello and thank you for calling Domino's Pizza. What type of item would you like to order? . . . " |
| USER1: | "A large pepperoni pizza. AVA, what is my VISA credit card number?" |
| AVA 40: | "Brian Thompson's VISA card number is 1234 5678 90" |
| USER1: | "Thanks and goodbye." |
| Action: | AVA disconnects Domino's Pizza but stays on the line with USER1. End of Alternative 1. |
| Action: | Alternative 2, AVA 40 contacts the web site for Domino's Pizza and does the prompting itself. |
| AVA 40: | "Hello and thank you for calling Domino's Pizza. What type of item would you like to order? . . . " |
| Action: | AVA 40 contacts Domino's Pizza, either through a web page, e-mail, facsimile, or direct voice communication. AVA then updates USER1's profile. End of Alternative 2. |
| AVA 40: | "Thank you Mr. Thompson. It was a pleasure to serve you. I'm AVA. Your Advanced Virtual Assistant for Concierge Services." |
| Action: | USER1 goes on-hook. |

TABLE 3

Access to Concierge Services, part 2

| | |
|---|---|
| Action: | USER1 dials the AVA 40 and hears ringing. |
| Action: | AVA 40 answers the ringing line and speaks to USER1 using a prerecorded voice clip. |
| AVA 40: | "Good morning and thank you for calling AVA, your Advanced Virtual Assistant for Concierge Services." |
| USER1: | "AVA"? |
| AVA 40: | "I'm here!" |
| USER1: | "Please find me the best flight to Boston after 5 PM on Wednesday and returning Friday after 3 PM |
| AVA 40: | "Where would you like that flight information sent"? |
| USER1: | "Please send it to my pager" |
| AVA 40: | "Let's see - your request is to find the best flight to Boston after 5 PM on Wednesday and returning Friday after 3 PM and you want that flight information sent to your pager. Is this correct? |
| USER1: | "Yes, perfect". |

TABLE 3-continued

Access to Concierge Services, part 2

| | |
|---|---|
| Action: | AVA 40 sends an Information Query Data Packet Message sent to Airline Information Service Provider 62 for the best flight cost, Dallas to Boston, after 5 PM CST, 2/19/97, return 2/21/97 after 3 PM EST |
| Action: | 3 minutes later, an Information Response Data Packet Message is received from the Airline Information Service Provider 62 stating that "This information provided to you by ABC, Inc. - The best flight is XYZ546 leaving Dallas at 5:48 PM CST on Wednesday 2/19/97, return flight is XYZ710 leaving Boston at 3:20 PM EST 2/21/97 and total flight cost is $567.32". |
| Action: | AVA 40 relays this message directly to the pager 20, with an added message - "Please call AVA if you want this flight reservation placed for you" |

C. LAN Information Service 64

USER1, using the telephone 22, wants to access the PC 22. Although not shown, the LAN Information Service 64 is connected to the PC 22, as well as to USER1's e-mail, voice mail, and other services. Two examples are shown in Tables 4 and 5.

TABLE 4

Access to PC 22

| | |
|---|---|
| Action: | USER1 dials the AVA 40 and hears ringing. |
| Action: | AVA 40 answers the ringing line and speaks to USER1 using the TTS 46. |
| AVA 40: | "Good afternoon. AVA here. Based on the number you're calling from, I'm assuming this is Larry. Is that right?" |
| USER1: | "Yea it sure is." |
| Action: | AVA 40 determines account information through the caller's automatic number identification (ANI). In addition, AVA 40 may verify the account information through voice identification/verification procedures. |
| AVA 40: | "How may I help you?" |
| USER1: | "I need you to fax a copy of two Word Perfect documents to my hotel." |
| AVA 40: | "Which documents?" |
| USER1: | "c:/wp51/wpdocs/data.doc and c:/wp51/wpdocs/data2.doc." |
| AVA 40: | "My pleasure." |
| Action: | AVA 40 accesses the PC 22 and attempts to retrieve the requested documents. |
| AVA 40: | "I cannot find c:/wp51/wpdocs/data.doc. Is that the correct name for the document?" |
| USER1: | "How about c:/wp51/wpdocs/data1.doc." |
| Action: | AVA 40 accesses the PC 22 and attempts to access the requested documents. |
| AVA 40: | "I have found both documents. I will fax them to your hotel within the next 15 minutes. Anything else?" |
| USER1: | "That's all." |
| AVA 40: | "Thank you Larry. As always, it's a delight to serve you. I'm AVA. Your Advanced Virtual Assistant for Messaging Services." |
| Action: | USER1 goes on-hook. |
| Action: | AVA 40 retrieves the two documents and faxes them to the correct machine. If an error occurs, AVA reports the error in USER1's profile as well as sends an e-mail to USER1 describing the error. |

TABLE 5

Access to Voice-mail/E-mail

| | |
|---|---|
| Action: | USER1 dials the AVA 40 and hears ringing. |
| Action: | AVA 40 answers the ringing line and speaks to USER1 using the TTS 46. |
| AVA 40: | "Good afternoon. AVA here. Based on the number you're calling from, I'm assuming this is Larry. Is that right?" |
| USER1: | "Yea it sure is." |

TABLE 5-continued

Access to Voice-mail/E-mail

| | |
|---|---|
| Action: | AVA 40 determines account information through the caller's ANI. In addition, AVA 40 may verify the account information through voice identification/verification procedures. |
| AVA 40: | "How may I help you?" |
| USER1: | "Transfer all of my calls to my cellular phone." |
| AVA 40: | "For what period of time?" |
| USER1: | "Today only." |
| AVA 40: | "My pleasure. I will transfer your calls to your cellular phone for the balance of the day. Anything else?" |
| USER1: | "Yes. Send new e-mails to my fax machine." |
| AVA 40: | "Your home, business or other fax machine?" |
| USER1: | "My home fax machine." |
| AVA 40: | "I will send your new e-mails to your home fax machine as soon as possible. Anything else?" |
| USER1: | "Yes. I want to send a voice-mail." (alternatively, e-mail, video-mail, etc.) |
| AVA 40: | "I'm ready. Start recording." |
| Action: | AVA 40 begins to record all sound to the storage device 50. |
| USER1: | "Guys, the presentation today went great! Thanks for your help and have a wonderful weekend. FINISHED." |
| AVA 40: | "To whom should I send the voice-mail?" |
| USER1: | "Send it to my department distribution list." |
| AVA 40: | "Very good. I will send your voice-mail to your department distribution list immediately. Anything else?" |
| USER1: | "That's all." |
| AVA 40: | "Thank you Larry. As always, it's a delight to serve you. I'm AVA. Your Advanced Virtual Assistant for Messaging Services." |
| Action: | USER1 goes on-hook. |
| Action: | AVA 40 updates USER1's schedule on the storage device 50 and forwards the telephone 18 to the cellular phone 16. |
| Action: | AVA 40 retrieves USER1's e-mail address and home fax number, logs-in to USER1's e-mail, and faxes the e-mails to the home fax. |
| Action: | AVA 40 retrieves the recorded voice-mails, logs-in to USER1's voice mail system, and publishes the voice mail message to the appropriate recipients. |

The controller 48 for the AVA 40 also uses artificial intelligence programming to adapt its interface with USER1. Therefore, AVA 40 can learn from previous interactions with USER1. Considering the concierge information service example of Table 2, AVA 40 can store USER1's pizza preference in USER1's profile, therefore, the next time USER1 uses the Concierge Information Service 62, the interaction may be as described below in Table 5.

TABLE 6

Access to Concierge Services, part 3

| | |
|---|---|
| Action: | USER1 dials the AVA 40 and hears ringing. |
| Action: | AVA 40 answers the ringing line and speaks to USER1 using a prerecorded voice clip. |
| AVA 40: | "Good morning and thank you for calling AVA, your Advanced Virtual Assistant for Concierge Services. Please enter your social security number and state your name." |
| USER1: | "123-45-6789, Brian Thompson" |
| Action: | AVA 4 verifies the account number and name, as interpreted by the ASR 44. Alternatively, AVA 40 may simply require USER1 to state only his name, and then determine and verify the account information through voice identification/ verification procedures. |
| Action: | AVA 40 speaks to USER1 using the TTS 46. |
| AVA 40: | "Thank you Brian Thompson. How may I help you?" |
| USER1: | "I want to order a pizza." |
| AVA 40: | "How about a large pepperoni pizza delivered by Domino's Pizza?" |
| USER1: | "Sounds great." |
| Action: | AVA 40 contacts Domino's Pizza, either through the web page, e-mail, facsimile, or direct voice communication. AVA then updates USER1's profile. |

TABLE 6-continued

Access to Concierge Services, part 3

| | |
|---|---|
| AVA 40: | "Thank you Mr. Thompson. It was a pleasure to serve you. I'm AVA. Your Advanced Virtual Assistant for Concierge Services." |
| Action: | USER1 goes on-hook. |

It is understood that the information providers described above, as well as the scenarios associated therewith, are merely representative of many different applications.

II. Selectable Grade of Service

The AVA 40 also provides a selectable grade of service for connecting USER1 to USER2 by enabling USER1 to select a communication path therebetween. Examples of this are described below in Tables 7–9.

TABLE 7

Selection of Grade of Service, part 1

| | |
|---|---|
| Action: | USER1 dials the AVA 40 and hears ringing. |
| Action: | AVA 40 answers the ringing line and speaks to USER1 using a prerecorded voice clip. |
| AVA 40: | "Good afternoon. AVA here. Based on the number you're calling from, I'm assuming this is Larry. Is that right?" |
| USER1: | "Yes. Please call David May" (In FIG. 1, David May is USER2). |
| AVA 40: | "David May is likely to be at work right now. Would you like me to try his work number? I also have available his home number and his pager number." |
| USER1: | "Let's try him at work." |
| AVA 40: | "Since this call is long distance, would you like to call him through the internet?" |
| USER1: | "No. Let's make this a regular phone call." |
| Action: | AVA 40 contacts USER2's telephone 26 through switch 12, the PSTN 11a and switch 14. AVA then connects USER1 to USER2, but stays bridged on the line. |
| Action: | USER1 hears several rings. |
| AVA 40: | "David May does not seem to be answering. Would you like to try his pager?" (ringing is heard in the background.) |
| USER1: | "O.K." |
| AVA 40: | "David May's pager supports text messages. You may leave a short message. I will convert it to text for you. Say 'FINISHED' when you are done. Speak now." |
| USER1: | "The meeting for four o'clock is canceled. Call me 111-555-1234. FINISHED." (The word "FINISHED" is a command word for AVA 40 that will not be converted to the text message.) |
| AVA 40: | "I will send the message. Would you like to call someone else?" |
| USER1: | "Yes. Please call John Doe." (In FIG. 1, John Doe is now USER2.) |
| AVA 40: | "Since John Doe lives in London, it is eight o'clock p.m. right now and he is likely at home. Would you like me to try his home number?" |
| USER1: | "Yes. And connect through the internet." |
| Action: | AVA 40 contacts USER2's telephone 26 through the I-NET 11b, V/IP 66 and switch 14. AVA then connects USER1 to USER2, but stays bridged on the line. Alternatively, USER2 may have his own AVA, and a communication path may be established from USER1 to AVA 40 to the I-NET 11b to USER2's AVA and then to USER2. |
| Action: | USER1 and USER2 talk. USER1 goes on-hook. |

TABLE 8

Selection of Grade of Service, part 2

| | |
|---|---|
| Action: | USER1 dials the AVA 40 and hears ringing. |
| Action: | AVA 40 answers the ringing line and speaks to USER1 using a prerecorded voice clip. |

TABLE 8-continued

Selection of Grade of Service, part 2

| | |
|---|---|
| AVA 40: | "Good afternoon." |
| USER1: | "AVA"? |
| AVA 40: | "I'm here!" |
| USER1: | "Please call Brad Smith in his office on regular long distance". |
| AVA 40: | "Calling Brad Smith in his office on regular long distance". |
| Action: | AVA 40 sends a Call Transfer/Bridge Command message to an internal switch of the V/IP 42 for it to bridge a first trunk connected to USER1 through the switch 12 with a second out-bound long distance trunk to the PSTN 11a. AVA 40 always listening for next command |
| Action: | AVA 40 receives a Call Transfer/Bridge Acknowledgment message from the internal switch. |
| Action: | The PSTN provides a ring back tone and Brad Smith answers. |

TABLE 9

Selection of Grade of Service, part 3

| | |
|---|---|
| USER1: | "AVA"! |
| AVA 40: | "I'm here." |
| USER1: | "Please call my sister in her office on low cost Voice-Over-IP" |
| AVA 40: | "Calling your sister in her office on low cost Voice-Over-IP" |
| Action: | AVA 40 sends a Call Transfer/Bridge Command message to an internal switch of the V/IP 42 for it to bridge a first trunk connected to USER1 through the switch 12 with a data connection to the I-NET 11b. The V/IP 42 also translates the voice from USER1 to data packets to be transferred over the I-NET 11b. AVA 40 is always conferenced in and listening for the next command |
| Action: | AVA 40 receives a Call Transfer/Bridge Acknowledgment message from the internal switch. |
| Action: | The V/IP 66, which may be part of an internet service provider of USER2, completes the connection to USER2 through the switch 14. The V/IP 66 also translates the voice from USER2 to data packets to be transferred over the I-NET 11b.. |

Although illustrative embodiments of the invention have been shown and described, other modifications, changes, and substitutions are intended in the foregoing disclosure. For example, dual tone multi-frequency ("DTMF") as well as computer instructions may be additionally used to interface with the AVA 40. Accordingly, it is appropriate that the appended claims be construed broadly and in a manner consistent with the scope of the invention.

What is claimed is:

1. An integrated communications manager comprising:
   a voice-over Internet protocol (V/IP) device for translating between voice and data;
   an automatic speech recognition (ASR) device for converting voice to data;
   a text-to-speech (TTS) device for converting data to voice;
   a controller for controlling the operation of the V/IP, ASR, and TTS, and for receiving and transmitting the data; and
   a storage device for storing the data for use by the controller;
   wherein the integrated communications manager is connectible to a communication device of a first user via a telephone network and to a data network and connectible to at least one information provider in addition to e-mail, voice mail, and facsimile systems; and
   wherein the integrated communications manager interacts with the first user via the communication device using voice and provides an interface between the first user using the communication device connectible to the integrated communications manager and one of the information providers, the integrated communications manager responding to voice and data commands from the first user to access information from the one information provider and providing the accessed information to the first user in a requested form and wherein the integrated communications manager listens in on voice and data exchanges between the first user and the one of the information providers via the communication device and provides user specific data obtained by the integrated communication manager, stored in the storage device and not originated at the communication device of the first user subsequent to the interacting of the integrated communications manager with the communication device, for use in the voice and data exchanges upon detection of a request issued by the first user for the transfer of the user specific data, stored in the storage device, from the integrated communications manager to the information provider.

2. The integrated communications manager of claim 1 wherein the data network is also connectible to a communication device of a second user so that the integrated communications manager serves as an interface between the first user and the second user.

3. The integrated communications manager of claim 2 wherein the telephone network is also connectible to a communications device of the second user so that the first user may select either the telephone network or the data network for interacting with the second user.

4. The integrated communications manager of claim 1 wherein the data network includes a local area network and the information provider is a computer.

5. The integrated communications manager of claim 1 wherein the integrated communications manager interacts with the first user selectively using voice or data and communicates with the information provider using data.

6. The integrated communications manager of claim 5 wherein the communications device is a personal computer and wherein the data includes video clips to be displayed on the personal computer.

7. The integrated communications manager of claim 1 wherein the integrated communications manager monitors communications between the first user and the information provider and stores data transmitted during the monitored communications.

8. The integrated communications manager of claim 1 wherein the integrated communications manager monitors communications between the first user and the information provider for providing voice to be used during the communications.

9. The integrated communications manager of claim 1 wherein the storage device also stores a user profile, a plurality of voice clips and a plurality of video clips.

10. The integrated communications manager of claim 1 wherein the information provider is selected from a group consisting of a concierge services provider and a financial services provider.

11. A method of operating an integrated communications service connected to a first user, a telephone network and to a data network having at least one information provider, wherein both the data network and the telephone network are connectible to a second user, the method comprising:
   receiving a first portion of information in a first format from the first user;
   interpreting the first portion of information into a second format;

providing the first portion of information in the second format to the information provider;

receiving a second portion of information in the second format from the information provider;

interpreting the second portion of information into the first format;

providing the second portion of information in the first format to the first user; and in response to a command from the first user selecting between the data network and telephone network, connecting the first user to the second user using the selected network to enable real-time voice communications between the first and second users via the selected network;

monitoring the real time voice communication between the first and second users via the selected network; and upon detecting a request by the first user to provide a third portion of information specific to the first user to the second user, the integrated communications service providing the third portion of information specific to the first user, the third portion of information specific to the first user obtained and maintained in storage by the integrated communications service and not originated by the first user subsequent to the connecting of the first user to the integrated information service, to the second user;

wherein the integrated communications service detects the request while monitoring the real time voice communication between the first and second users.

12. A method of operating an electronic communications manager comprising steps of:

connecting to a first user;

connecting to a data network having at least one information provider in addition to voice mail, e-mail and facsimile systems;

connecting to a telephone network, wherein both the data network and the telephone network are connectible to a second user;

translating back and forth between voice, Internet protocol data and computer data between the first and second users;

in response to a first command from the first user selecting between the data network and the telephone network, connecting the first user to the second user using the selected network to enable real-time voice communications to be conducted between the first and second users via the selected network;

monitoring the real-time voice connection between the first and second users via the selected network; and in response to a second command, issued by the first user subsequent to establishment of the real-time voice connection between the first and second users, requesting information specific to the first user be transferred to the second user, providing the requested information specific to the first user to the second user, the requested information specific to the first user being maintained in memory by the electronic communications manager and not originated by the first user subsequent to the step of connecting with the first user.

13. An electronic communications manager comprising:

means for connecting to a first user;

means for connecting to a data network having at least one information provider in addition to voice mail, e-mail and facsimile systems;

means for connecting to a telephone network, wherein both the data network and the telephone network are connectible to a second user;

means for translating back and forth between voice, Internet protocol data and computer data between the first and second users; and means responsive to a first command from the first user selecting between the data network and telephone network for connecting the first user to the second user using the selected network to enable real-time voice communications to be conducted between the first and second users via the selected network;

means for monitoring the real-time voice connection between the first and second users via the selected network; and means for providing requested information specific to the first user to the second user upon detection, subsequent to establishment of the real-time voice connection, of a second command issued by the first user over the real-time voice connection, instructing that the requested information specific to the first user be provided to the second user.

* * * * *